United States Patent [19]
Smith et al.

[11] Patent Number: 5,106,002
[45] Date of Patent: Apr. 21, 1992

[54] HITCH MOUNTED CARRIER ASSEMBLY AND METHOD

[76] Inventors: Glenn C. Smith; Kenneth E. Snyder, both of P.O. Box 2443, Anderson, S.C. 29622

[21] Appl. No.: 556,662

[22] Filed: Jul. 23, 1990

[51] Int. Cl.⁵ .................................................. B60R 9/00
[52] U.S. Cl. ........................ 224/42.03 A; 224/42.03 R; 224/42.07
[58] Field of Search ................. 224/42.03 A, 42.03 R, 224/42.07, 42.08, 42.03 B

[56] References Cited

U.S. PATENT DOCUMENTS

| | | | |
|---|---|---|---|
| 3,334,761 | 8/1967 | Perri | 224/42.08 X |
| 4,596,347 | 6/1986 | Hite | 224/42.08 |
| 4,813,584 | 3/1989 | Wiley | 224/42.07 X |
| 4,938,399 | 7/1990 | Hull et al. | 224/42.03 A X |
| 5,018,651 | 5/1991 | Hull et al. | 224/42.08 X |

Primary Examiner—Ernest G. Cusick
Assistant Examiner—David J. Walczak
Attorney, Agent, or Firm—Bailey & Hardaway

[57] ABSTRACT

An apparatus and method for transporting a load upon a vehicle is provided. The apparatus of the invention is a carrier assembly for attachment to a receiver mounted on the rear of a vehicle. The carrier assembly comprises a basket, a hitch for attaching the carrier assembly to the receiver, a riser extending upwardly and outwardly from the hitch, an extension projecting rearwardly from the riser and supporting the basket, and a pivotal connection whereby the basket may be maintained in an upright position or pivoted down and away from the vehicle. The method is carried out using the apparatus to transport loads and by pivoting the basket rearwardly and downwardly from an upright transport position to facilitate access to the rear of the vehicle.

8 Claims, 5 Drawing Sheets

HITCH MOUNTED CARRIER ASSEMBLY AND METHOD

BACKGROUND OF THE INVENTION

This invention relates to a carrier assembly for attachment to a receiver mounted on the rear of a vehicle. The carrier assembly comprises a receptacle positioned upwardly and outwardly from the receiver. The receptacle is capable of being pivoted downwardly and rearwardly to facilitate access to the rear of the vehicle.

Automobiles and other passenger vehicles are used for an assortment of purposes in addition to mere transportation. For example, automobiles are frequently employed in the transportation of a variety of loads. Often, for reasons of space or cleanliness, it is desired that these loads be carried outside of, but connected to, the vehicle. The popularity of trailers evidences this fact. Trailers, however, are difficult to maneuver. U.S. Pat. Nos. 3,235,284 and 4,593,840 illustrate trailer arrangements.

Other load carrying devices are connected to the vehicle in ways that avoid the maneuverability problem inherent with trailers. These arrangements include devices connected to vehicles's bumper or body. Examples of such apparatus are shown in U.S. Pat. Nos. 1,648,211, 1,797,596, 3,163,339, 3,650,443, 4,221,311 and 4,320,862. All of these patents except U.S. Pat. No. 4,320,862 merely disclose racks which require the user to provide a separate carrying receptacle. In addition most of these carriers are incapable of withstanding relatively heavy loads, and some are not sufficiently elevated to prevent their scraping the ground when the vehicle encounters dips in the road. Moreover, such designs often damage the body and bumper of the vehicle when attached thereto.

The detachable cargo carrier disclosed by Wiley in U.S. Pat. No. 4,813,584 overcomes some of these problems by providing a cargo carrier which is detachably engageable with and connected solely to a standard trailer hitch tongue; however, the carrier disclosed is the patent to Wiley, like U.S. Pat. No. 4,320,862, the only other cited reference with an integral carrying basket, must be completely removed if used with a vehicle having a tailgate if the tailgate is to be opened.

SUMMARY OF THE INVENTION

It is thus an object of the present invention to provide an improved assembly for hauling loads with a passenger vehicle.

It is a further object of the invention to provide a carrier assembly that does not significantly impair vehicle maneuverability.

It is still a further object of the invention to provide a carrier assembly that can support relatively heavy loads and will not scrape the ground when the vehicle encounters dips in the road.

It is still a further object of the invention to provide a carrier assembly which need not be removed if the vehicle has a tailgate and it is desired that the tailgate be opened.

It is also an object of the invention to provide an improved method of transporting a load upon a vehicle with a tailgate.

Some of these objects are accomplished by a carrier assembly for attachment to a receiver mounted on a rear of a vehicle. The carrier assembly comprises an upright receptacle having a bottom and sides, a hitch for attaching the carrier assembly to the receiver, a riser extending upwardly and outwardly from the hitch, an extension projecting rearwardly from the riser and supporting the receptacle, and a pivotal connection whereby the receptacle may be maintained in an upright position on the extension or pivoted down and away from the vehicle.

The method of the invention is carried out by providing a receptacle containing a load, providing attachment to a rear of a vehicle, supporting the receptacle above the attachment in an upright position, latching said receptacle in the upright position during transport, and pivoting the receptacle rearwardly and downwardly for access to the rear of the vehicle.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

In accordance with this invention, it has been found that an improved apparatus and method of transporting a load upon a vehicle may be provided. A carrier assembly for attachment to a receiver mounted on a rear of a vehicle is illustrated. The carrier assembly has an upright receptacle A having a bottom and sides. A hitch B attaches the carrier assembly to the receiver. A riser C extends upwardly and outwardly from the hitch B and has a fixed connection thereto. The receptacle A is supported by an extension D, which projects horizontally and rearwardly from the riser C. A pivotal connection E is provided for positioning the receptacle in upright position o the extension for pivotal movement downwardly and rearwardly away from the vehicle. A latch F releasably secures the receptacle in upright position. Thus, the receptacle may be carried in raised position above the receiver at the rear of the vehicle for transport and then pivoted rearwardly and lowered for access to the rear of the vehicle.

Figure 1:
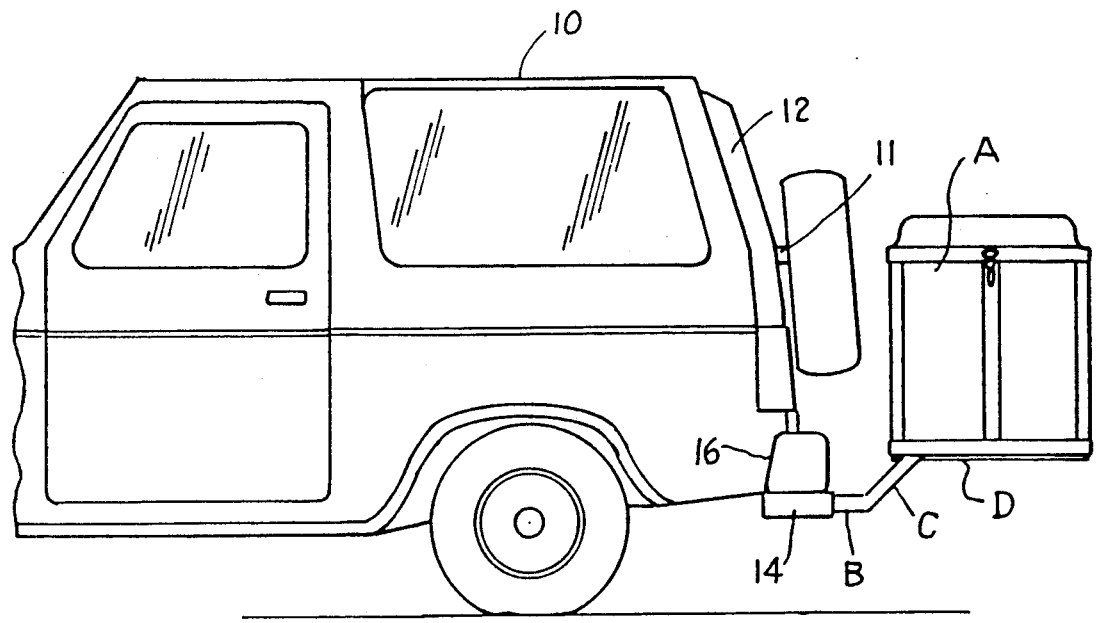
FIG. 1 is a side elevation illustrating a carrier assembly constructed in accordance with the invention attached to a receiver mounted on the rear of a vehicle with the receptacle in the upright position.

FIG. 1 further illustrates a preferred embodiment of the invention. The carrier assembly is illustrated as being mounted on the rear of a vehicle 10 extending rearwardly of the swingable wheel mount 11 and upwardly pivoted door or tailgate 12 for gaining access to the rear of the vehicle. Mounting is achieved by the slidable horizontal reception of the hitch B by the receiver 14. Receiver 14 is permanently fixed below the bumper 16 of the vehicle 10 on the mounting bar 15. The extension D supports the receptacle A for transport in an upright position as shown. An end of extension D is fixedly secured as by welding at 18 (FIG. 3) to the upper end of the riser C. The lower end of the riser C is fixedly secured as by welding as at 20 to an end of the hitch B. The riser C thereby supports the extension D and the receptacle A, carried thereby to a level such that scraping will not occur if the vehicle 10 encounters sharp dips or holes in the road. The receptacle A extends transversely for a greater distance than longitudinally rearwardly. For best results, the hitch B, the riser C, and the extension D may be of tubular construction. As should be apparent, the assembly has no wheels and, therefore, does not negatively affect the maneuverability of vehicle 10 to the same degree as would a trailer.

Figure 2:
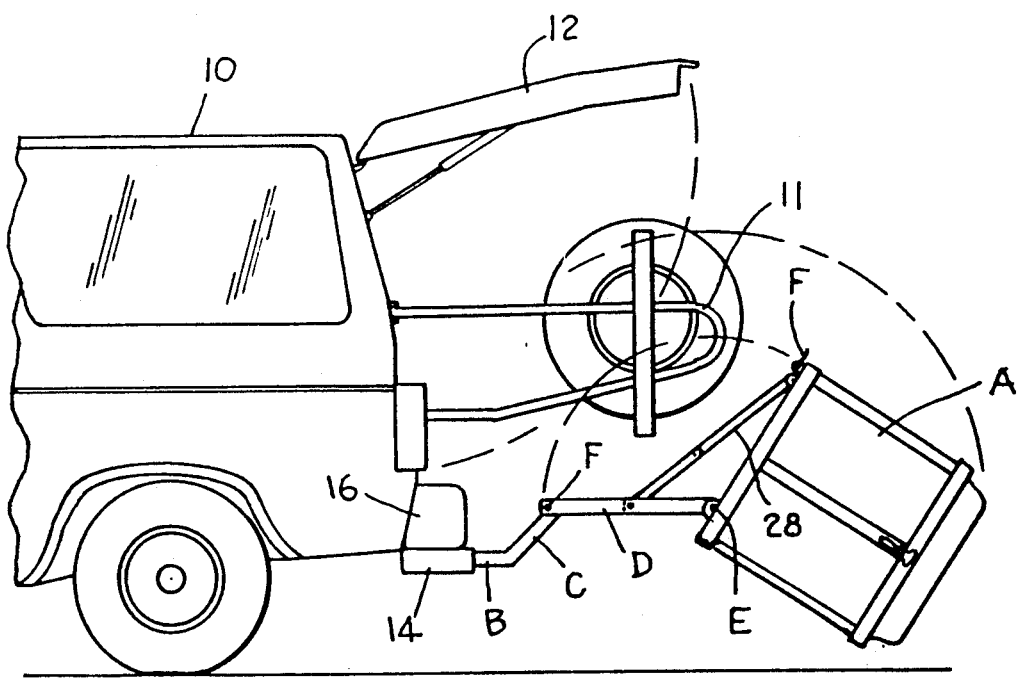
FIG. 2 is a view similar to FIG. 1 illustrating the pivotal movement of the receptacle to facilitate access to the rear of the vehicle.

Passenger vehicles such as station wagons having rear closure members are very popular. Other examples are four-wheel drive vehicles as marketed by the Ford Motor Co. under the name Bronco II. As seen in FIG. 2, the present invention allows the receptacle A to be easily pivoted downwardly and rearwardly away from vehicle 10 so that a rear closure member, such as the tailgate 12, may be opened. Access to the rear of vehicle is thus provided without the complete removal of assembly, as would have been required with prior art devices.

Figure 3:
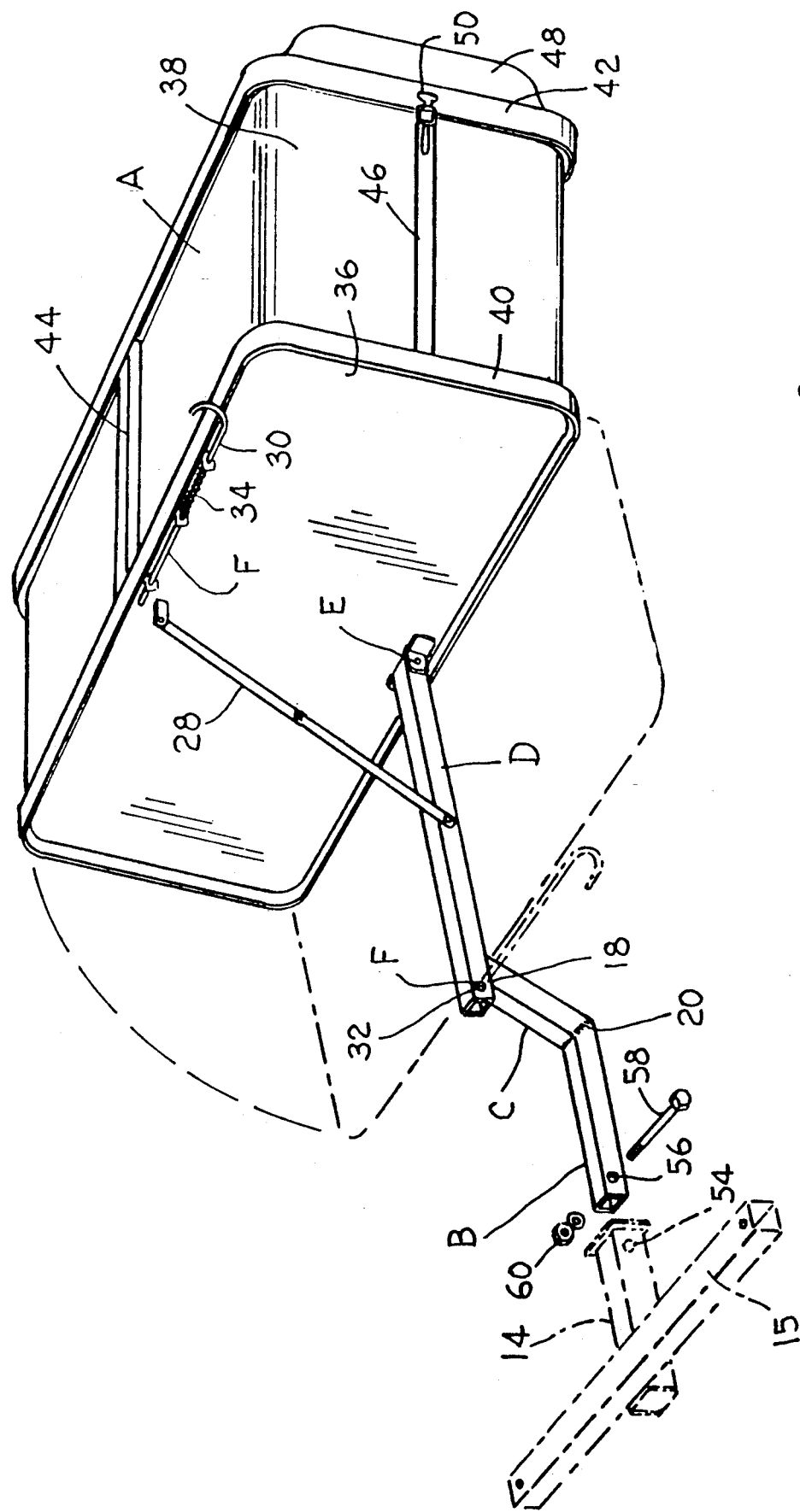
FIG. 3 is a perspective view of the carrier assembly of the invention with the receiver removed from the vehicle to show in detail the method of attachment of the hitch to the receiver and further illustrating in detail the pivotal movement of the receptacle.

The pivoting of the receptacle A can be best seen in FIG. 3. A pivotal connection, such as transverse pivot E is located at the free end 26 of the extension D. The pivot E attaches the receptacle A to the extension D for maintenance of receptacle A in the upright position or lowered position, as desired. An extensible member, such as the pivoted linkage 28, limits the rotation of the receptacle A away from the upright position. The receptacle A is secured in the upright position during travel by the latch F, which includes a spring biased bar 30, fits into the hole 32. The user simply pulls latch 30 out of hole 32, thus overcoming the force of the spring 34, to release receptacle A for rotation. The receptacle A has a bottom 36 and four sides, one of which is referenced at 38. The receptacle A is of durable construction, due partly to the lower reinforcing marginal frame member 40, upper reinforcing marginal frame member 42, and a plurality of upright connecting frame members, such as shown at 44 and 46, therebetween. The receptacle A further has a cover 48, which fits snugly over the member 42. The cover 48 is secured by a latch 50.

The receiver 14 is typically a class 3A hitch giving the assembly a load carrying capacity of several hundred pounds. The free end of the hitch B is inserted into the receiver 14 such that holes 54 and 56 are in alignment. In this way, the bolt 58 may be inserted completely through receiver 14. Attachment of the assembly 10 to the receiver 14 is maintained by the threadable reception of the nut 60 upon the bolt 58.

Figure 4:
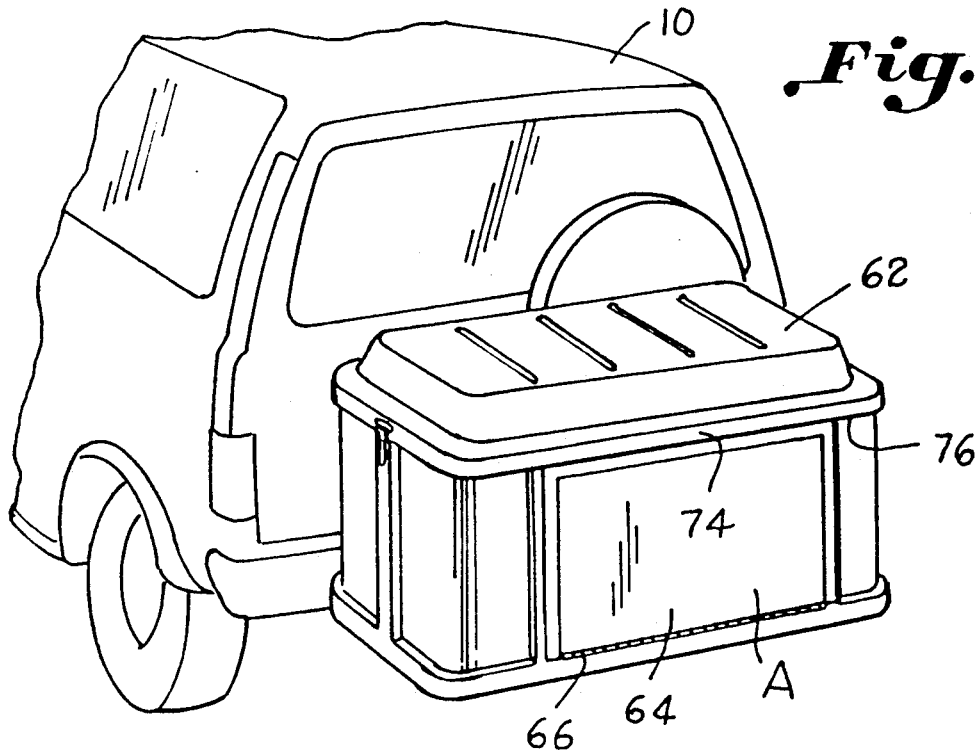
FIG. 4 is a perspective view of the carrier assembly mounted on a vehicle showing a receptacle equipped with a front wall panel.
Figure 5:
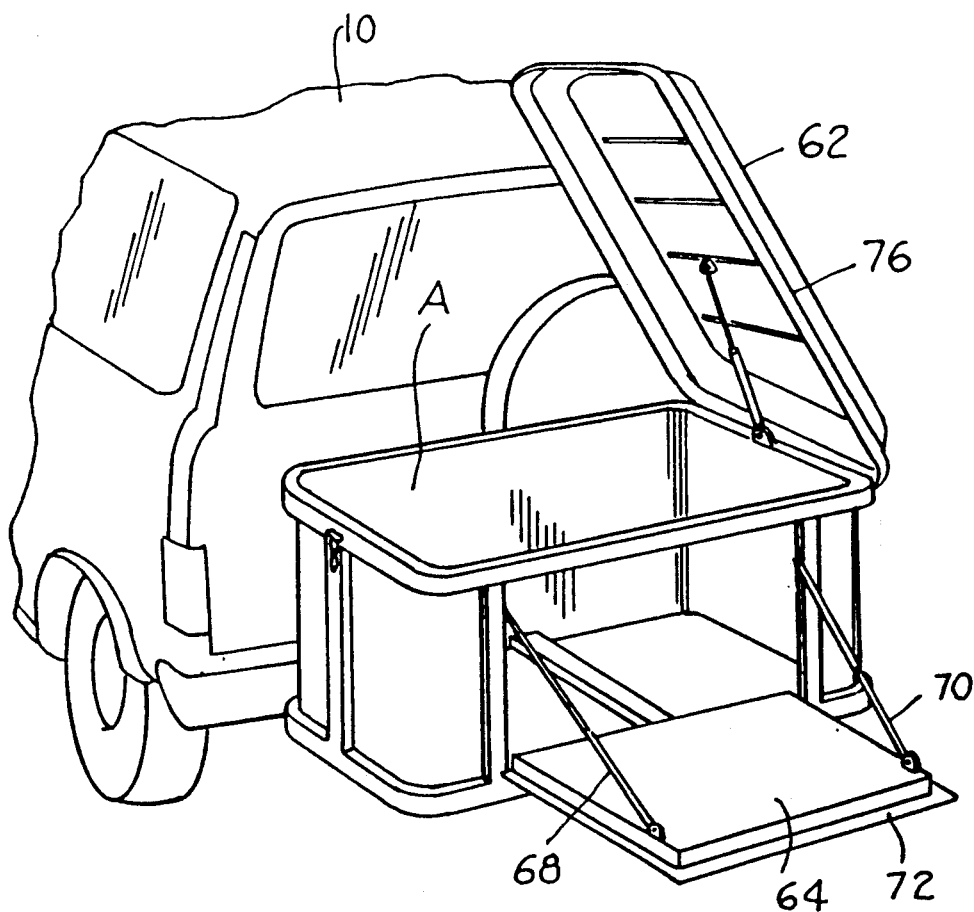
FIG. 5 is a view similar to FIG. 4, but with the receptacle cover raised up and the receptacle front wall panel down.

The receptacle A may take on a variety of configurations. Some of the modified forms of the invention will now be discussed. FIGS. 4 and 5 illustrate a modified form of the invention which is particularly well suited for recreational uses such as "tailgating" at ballgames. The hinged cover 62 provides access to the inside of receptacle A from above. Additionally, a front wall panel 64 is provided. The panel 64 is pivoted at a lower edge 66 such that downward pivotal movement forms a table (FIG. 5). Downward pivotal movement is limited by linkages 68 and 70. When the panel 64 is in the upright position (FIG. 4), the upper edge 72 is outside of the frame member 74 and inside of and confined by lower edge 76 of cover 62. The inside of the receptacle A may or may not be insulated.

Figure 6:
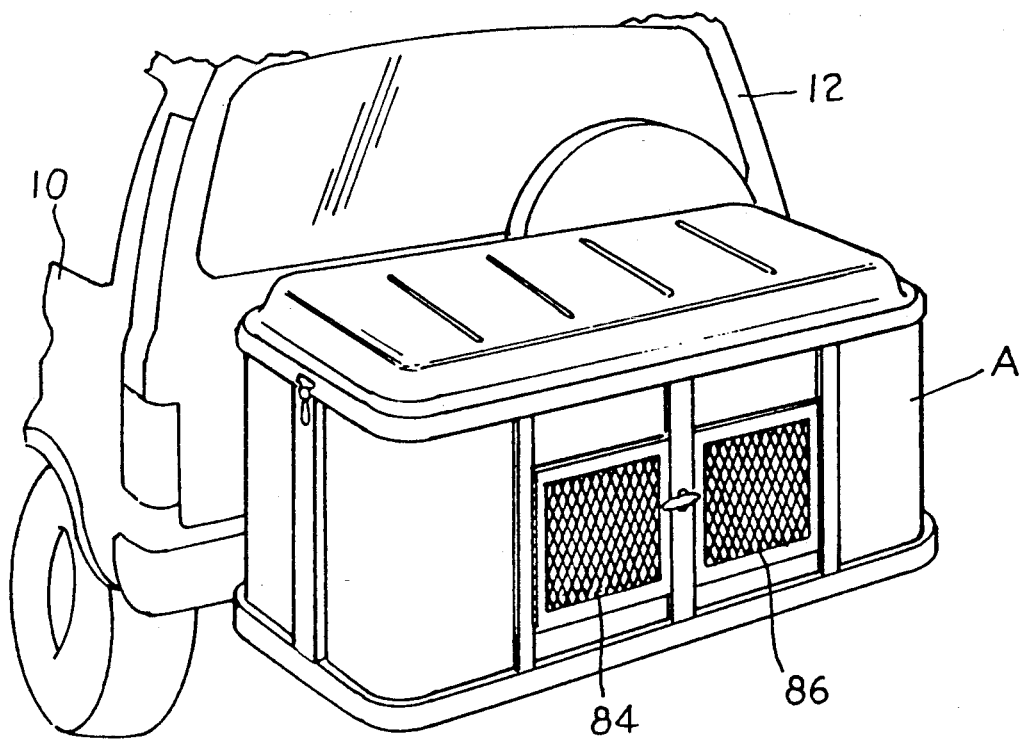
FIG. 6 is a perspective view similar to FIG. 4, but showing an alternative receptacle configuration suited for the transportation of animals.
Figure 7:
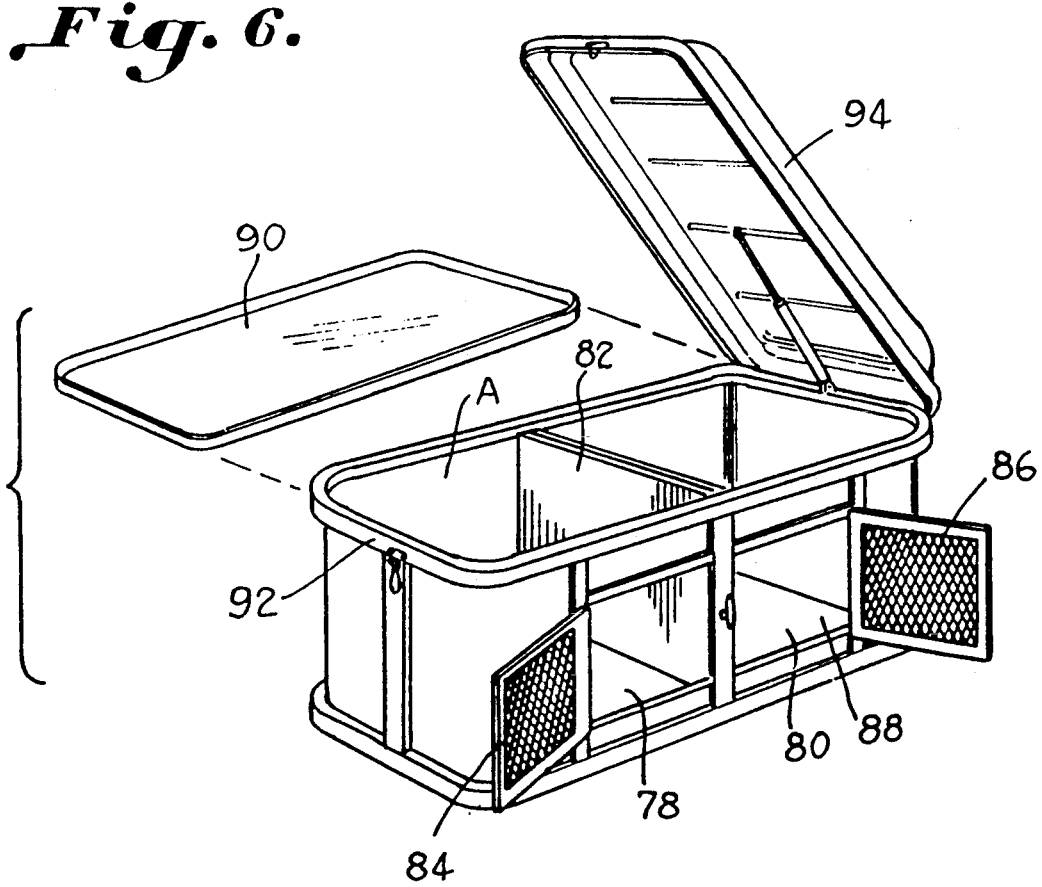
FIG. 7 is a view similar to FIG. 6, but with the receptacle doors open and the receptacle cover raised up and further showing the partition dividing the receptacle into side-by-side compartments as well as the removal of a tray carried beneath the cover.

FIGS. 6 and 7 illustrate a modified form of the invention wherein the receptacle A is adapted for the transportation of dogs or other animals. As shown in FIG. 7, the receptacle A may be divided into two identical side-by-side compartments 78 and 80 by a central longitudinal partition 82. The compartment 78 has a door 84 and compartment 80 has a door 86. For adequate airflow to the animals, the bottoms 88 should be constructed of a foraminous material. The positioning of a tray 90 in the frame member 92 (FIG. 7) provides a small storage area below the cover 94 to which animals carried in the basket cannot gain access.

Figure 8:
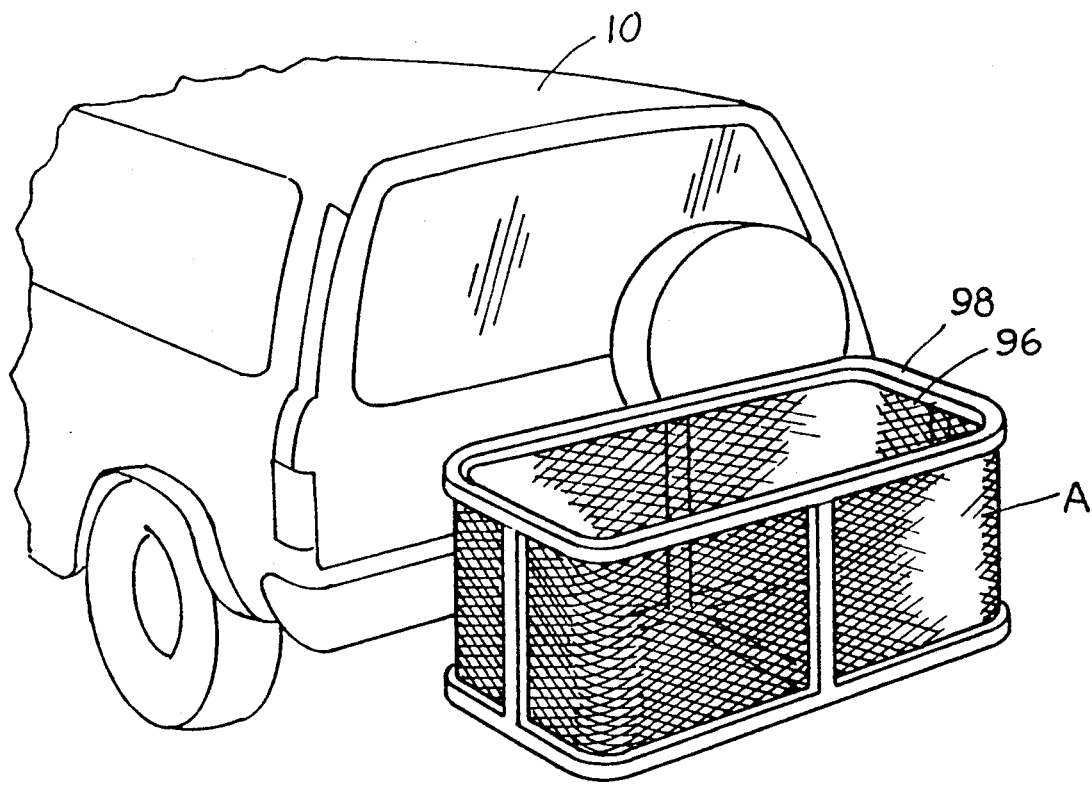
FIG. 8 is a view similar to FIG. 4, but showing an alternative receptacle configuration constructed essentially of a durable metal grating.
Figure 9:
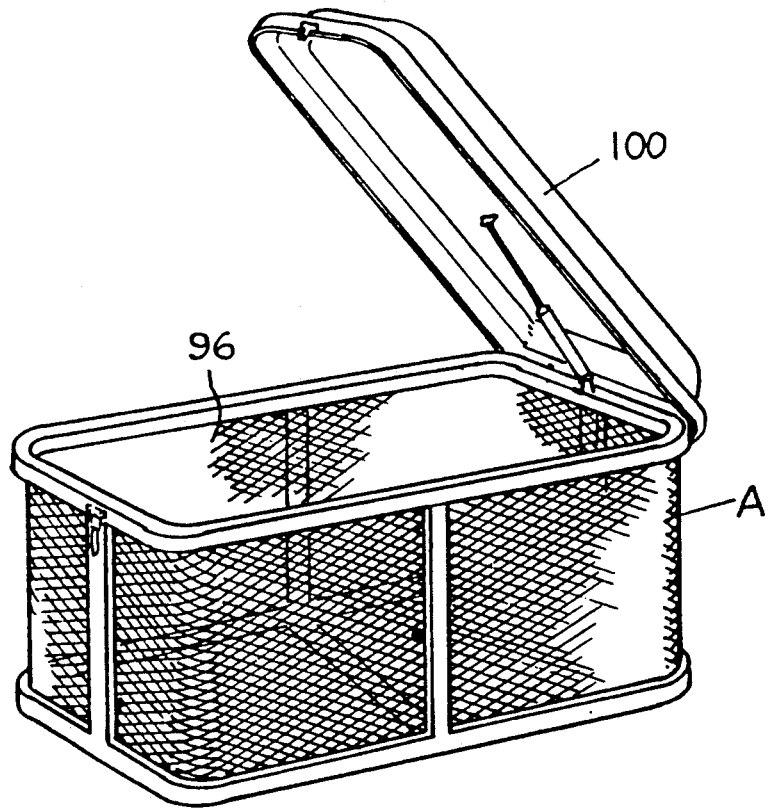
FIG. 9 is a perspective view of the receptacle of FIG. 8 further having a cover.

FIGS. 8 and 9 illustrate the construction of receptacle A generally of a durable expanded metal 96. This version is ideal for the transportation of loads which are heavy and irregularly shaped, such as firewood. The grating allows receptacle A to be easily cleaned using a garden hose. The receptacle A in this version may be open at upper marginal frame member 98 (FIG. 8) or may have a cover (such as shown at 100 in FIG. 9).

As mentioned above, the invention also contemplates an improved method of transporting a load upon a vehicle having a rear opening. First, a receptacle A is provided containing a load to be transported. Further provided is an attachment to the rear of the vehicle. The receptacle A is then supported above the attachment in an upright position. During transport the receptacle A is latched and secured in the upright position. If access to the rear of the vehicle is desired, the receptacle is pivoted rearwardly and downwardly away from the vehicle, thereby resulting in the desired access.

Thus, an improved apparatus and method of transporting a load upon a vehicle has been provided.

While a preferred embodiment of the invention has been described using specific terms, such description is for illustrative purposes only, and it is to be understood that changes and variations may be made without departing from the spirit or scope of the following claims.

What is claimed is:

1. A carrier assembly for attachment to a receiver mounted on a rear of a vehicle comprising:
   an upright receptacle having a bottom and sides;
   a single hitch for attaching said carrier assembly to said receiver;

a single riser extending upwardly and outwardly from a first free end of said single hitch and having a first fixed connection to said single hitch at said first free end;

a single extension projecting rearwardly from a second free end of said single riser, having a second fixed connection to said single riser at said second free end and supporting said receptacle;

said single hitch, said simple riser and said single extension being arranged in the same plane;

a pivotal connection adjacent an end of said single extension remote from said second fixed connection for positioning said receptacle in an upright position on said single extension for pivotal movement downwardly and rearwardly away from the vehicle; and a latch releasably securing said receptacle in said upright position;

whereby said receptacle may be carried in a raised position above the receiver at the rear of the vehicle for transport and then pivoted rearwardly and lowered for access to the rear of the vehicle, and whereby sufficient space is provided for said access.

2. The structure set forth in claim 1 wherein said latch includes a spring biased bar disposed beneath said receptacle, a portion of said bar adapted for insertion into a aperture in an end of said extension adjacent said second fixed connection for securing said receptacle in an upright position during travel.

3. The structure set forth in claim 1 including an extensible member for limiting the downward pivotal movement of said receptacle.

4. The structure set forth in claim 1 wherein said receptacle includes a cover, a bottom constructed of foraminous material, and a central longitudinal partition dividing said receptacle into side by side compartments each having a door.

5. The structure set forth in claim 1 wherein said receptacle includes:
a cover;
an upper and a lower marginal frame member;
upright connecting members between said marginal frame members; and
a tray carried by said upper marginal frame member below said cover.

6. The structure set forth in claim 4 further comprising a tray disposed below said cover.

7. A method of transporting a load upon a vehicle comprising the steps of:
providing a receptacle containing said load;
providing a hitch connecting said receptacle to said vehicle;
providing a riser elevating said receptacle above said hitch;
providing a rearward extension supporting said receptacle;
said hitch, said riser and said extension being arranged in the same plane;
providing a pivotal connection adjacent an extreme rearward end of said extension for positioning said receptacle in an upright position on said extension for pivotal movement downwardly and rearwardly away from the vehicle; and
latching said receptacle in said upright position during transport.

8. A method for gaining access to a tailgate of a vehicle comprising the steps of:
providing a hitch connecting a receptacle to said vehicle;
providing a riser elevating said receptacle above said hitch;
providing a rearward extension supporting said receptacle;
said hitch, said riser and said extension being arranged in the same plane;
providing a pivotal connection adjacent an extreme rearward end of said extension for positioning said receptacle in an upright position on said extension for pivotal movement downwardly and rearwardly away from the vehicle;
releasing a latch freeing said receptacle from being disposed in said upright position; and
pivoting said receptacle rearwardly and downwardly for access to the tailgate.

* * * * *